(12) United States Patent
Uotani et al.

(10) Patent No.: US 11,820,174 B2
(45) Date of Patent: Nov. 21, 2023

(54) TIRE

(71) Applicant: Sumitomo Rubber Industries, Ltd., Kobe (JP)

(72) Inventors: Ryota Uotani, Kobe (JP); Tatsuya Kobayashi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/499,066

(22) Filed: Oct. 12, 2021

(65) Prior Publication Data

US 2022/0126630 A1 Apr. 28, 2022

(30) Foreign Application Priority Data

Oct. 26, 2020 (JP) .................................. 2020-178972

(51) Int. Cl.
*B60C 11/01* (2006.01)
*B60C 11/12* (2006.01)
*B60C 11/13* (2006.01)

(52) U.S. Cl.
CPC .......... *B60C 11/01* (2013.01); *B60C 11/1272* (2013.01); *B60C 11/1376* (2013.01); *B60C 11/1392* (2013.01); *B60C 2011/1213* (2013.01); *B60C 2011/1245* (2013.01)

(58) Field of Classification Search
CPC ............. B60C 2011/1245; B60C 11/01; B60C 11/0083; B60C 11/1392; B60C 11/12–1281; B60C 11/1376; B60C 2011/0381; B60C 11/03
See application file for complete search history.

(56) References Cited

U.S. PATENT DOCUMENTS

| 4,878,526 A * | 11/1989 | Ochiai | .................... B60C 11/12 |
| | | | 152/DIG. 3 |
| 2002/0100526 A1 | 8/2002 | Matsumoto | |
| 2013/0087261 A1* | 4/2013 | Kageyama | .......... B60C 11/1218 |
| | | | 152/209.8 |

(Continued)

FOREIGN PATENT DOCUMENTS

| CN | 104108289 A | * 10/2014 |
| DE | 10 2010 060 255 A1 | 5/2012 |

(Continued)

OTHER PUBLICATIONS

CN 104108289 Machine Translation; Yamaoka, Hiroshi (Year: 2014).*
Extended European Search Report for European Application No. 21193279.3, dated Feb. 10, 2022.

*Primary Examiner* — Cedrick S Williams
*Assistant Examiner* — Nicholas J Weiler
(74) *Attorney, Agent, or Firm* — Birch, Stewart, Kolasch & Birch, LLP (57) ABSTRACT

A tire comprises a tread portion comprising a shoulder land region provided with shoulder lateral grooves and circumferential sipes connecting between the shoulder lateral grooves. The shoulder lateral grooves are each provided with a chamfer. The circumferential sipes are each spaced apart from an axially inner end of the shoulder land region by an axial distance of from 30% to 100% of an axial width of the shoulder land region. The depths of the circumferential sipes are equal to or greater than the groove depths of the shoulder lateral grooves.

10 Claims, 9 Drawing Sheets

(56) References Cited

U.S. PATENT DOCUMENTS

| | | | |
|---|---|---|---|
| 2013/0133798 A1* | 5/2013 | Ochi | B60C 11/0302 |
| | | | 152/209.18 |
| 2015/0258858 A1* | 9/2015 | Kujime | B60C 11/1392 |
| | | | 152/209.8 |
| 2015/0283855 A1* | 10/2015 | Kobayashi | B60C 11/01 |
| | | | 152/209.18 |
| 2016/0236519 A1* | 8/2016 | Wakiyama | B60C 11/0306 |
| 2018/0029423 A1 | 2/2018 | Mosnier et al. | |
| 2019/0176536 A1 | 6/2019 | Yasunaga | |
| 2020/0198406 A1* | 6/2020 | Philipot | B60C 11/0306 |

FOREIGN PATENT DOCUMENTS

| | | |
|---|---|---|
| EP | 2 204 294 A1 | 7/2010 |
| EP | 3 375 631 A1 | 9/2018 |
| EP | 3 695 988 A1 | 8/2020 |
| JP | 2002-172916 A | 6/2002 |
| WO | WO 2015/193805 A1 | 12/2015 |

\* cited by examiner

TIRE

BACKGROUND OF THE INVENTION

Field of the Invention

The present disclosure relates to a tire.

Background Art

Patent Document 1 below discloses a pneumatic tire in which blocks are formed by providing a circumferential main groove and lateral main grooves. The block is provided with a chamfered portion cut out from the wall surface of the block facing the circumferential main groove. The chamfered portion has an upper edge at which the chamfered portion intersects the block surface and a lower edge at which the chamfered portion intersects the wall surface. The chamfer width between the upper edge and the lower edge increases from both ends in the tire circumferential direction toward the central portion in the circumferential direction. Such pneumatic tire is explained as being possible to suppress an increase in cornering power, while maintaining high block rigidity, and thereby, the vehicle's overturning limit can be improved, while ensuring excellent wear resistance of the tire.

Patent Document 1: Japanese Patent Application Publication No. 2002-172916

SUMMARY OF THE INVENTION

Problems to be Solved by the Invention

As described above, in recent years, it is required to improve the resistance to overturning of a vehicle, while maintaining the wear resistance of the tire.

The present disclosure was made in view of the above circumstances, and a main object of the present disclosure is to provide a tire capable of improving the resistance to overturning of a vehicle, while maintaining the wear resistance of the tire.

DETAILED DESCRIPTION OF THE INVENTION

According to the present disclosure, a tire comprises:
a tread portion comprising a shoulder land region including a tread edge and provided with shoulder lateral grooves and circumferential sipes connecting between the shoulder lateral grooves,
the shoulder lateral grooves are each provided with a chamfer,
the circumferential sipes are each spaced apart from the axially inner end of the shoulder land region by an axial distance of from 30% to 100% of the axial width of the shoulder land region,
the depths of the circumferential sipes are equal to or greater than the groove depths of the shoulder lateral grooves.

Effects of the Invention

In the tire according to the present disclosure, by adopting the above configuration, the tire can improve the resistance to overturning of a vehicle, while maintaining the wear resistance of the tire.

DETAILED DESCRIPTION OF THE INVENTION

The present disclosure can be applied to a pneumatic tire as well as a non-pneumatic tire so called airless tire, for various vehicles, for example, passenger cars, SUVs, light trucks, heavy duty vehicles such as truck and bus and the like, but suitably applied to a pneumatic tire for SUVs.

Taking a pneumatic tire for SUVs as an example, embodiments of the present disclosure will be described with reference to the drawings.

Figure 1:
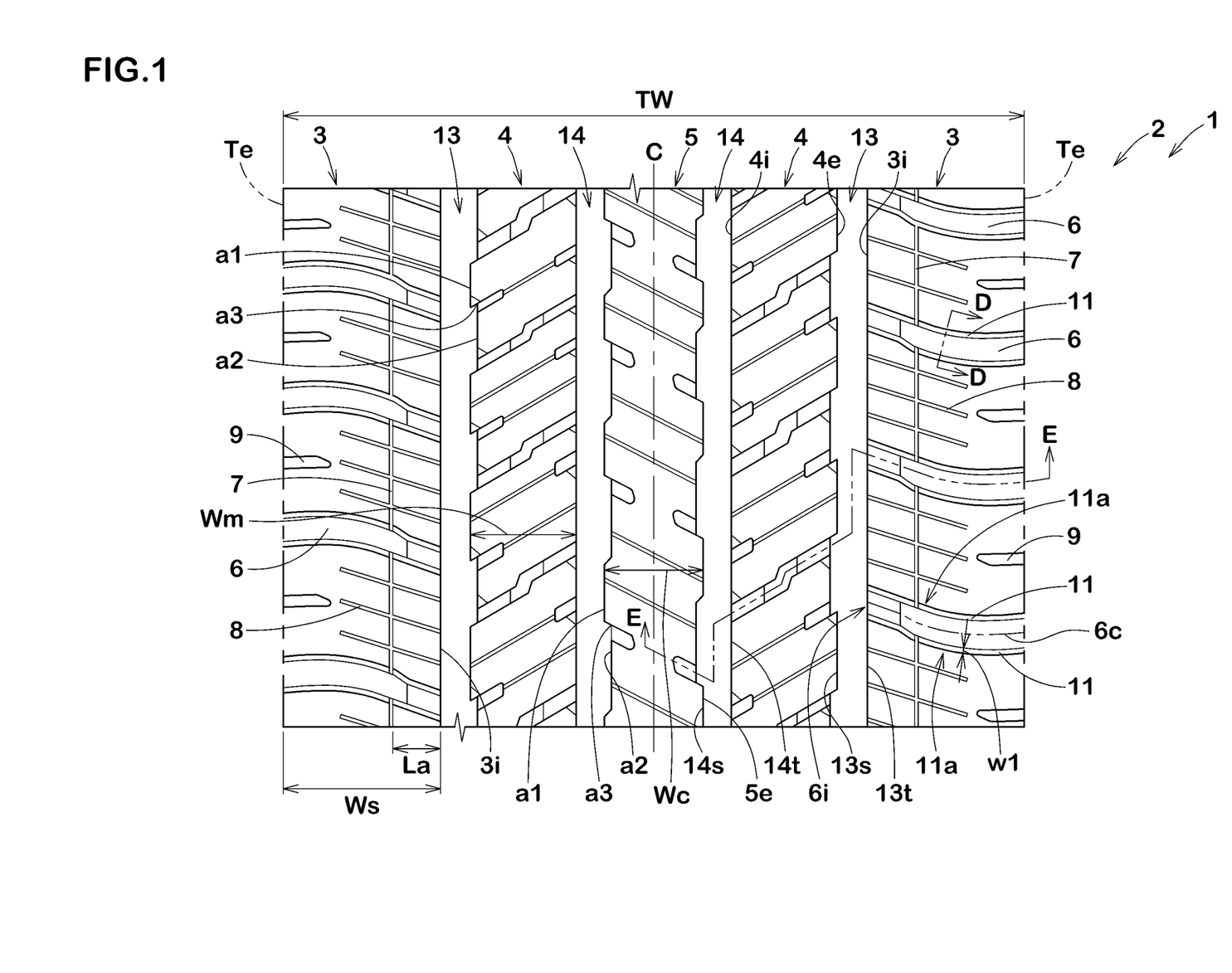
FIG. 1 is a developed partial view of a tread portion of a pneumatic tire according to the present disclosure.

FIG. 1 shows the tread portion 2 of a pneumatic tire 1 for SUVs as an embodiment of the present disclosure.

In this application including specification and claims, various dimensions, positions and the like of the tire refer to those under the standard state of the tire unless otherwise noted.

The "standard state" of a tire is as follows.

In the case of a pneumatic tire, the "standard state" is such that the tire is mounted on a standard rim, and inflated to a standard pressure, but loaded with no tire load.

In the case of a non-pneumatic tire, the "standard state" is such that the tire is ready to attach to a vehicle axis but not attached, and loaded with no tire load. Namely, if the non-pneumatic tire needs to be mounted on a wheel rim or any equivalent device, the "standard state" is such that the tire is mounted on such a wheel rim or equivalent device, but loaded with no tire load.

The above-mentioned standard rim, in particular that for a pneumatic tire, is a wheel rim officially approved or recommended for the tire by standards organizations, i.e. JATMA (Japan and Asia), T&RA (North America). ETRTO (Europe), TRAA (Australia), STRO (Scandinavia), ALAPA (Latin America), ITTAC (India) and the like which are effective in the area where the tire is manufactured, sold or used. The standard pressure and a standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

If there is no applicable standards for the pneumatic tire, or not yet established, the standard rim, the standard pressure and the standard tire load mean a design rim, a maximum pressure and s maximum tire load specified for the tire by the tire manufacturer or the like.

In the case of a non-pneumatic tire for which applicable standards have not yet established, the standard tire load means a maximum tire load specified by the tire manufacturer or the like. If the non-pneumatic tire needs to be mounted on a wheel rim or any equivalent device, the standard rim means a design rim or equivalent specified by the tire manufacturer or the like.

The tread edges Te mean the axial outermost edges of the ground contacting patch of the tire which occurs when the tire under the standard state is put on a flat horizontal surface at a camber angle of zero and loaded with the standard tire load.

The tread width is the width measured under the standard state, as the axial distance between the tread edges determined as above.

In the present embodiment, the tread portion 2 has a shoulder land region 3 including a tread edge Te.

The shoulder land region 3 is provided with shoulder lateral grooves 6, and circumferential sipes 7 connecting between the shoulder lateral grooves 6.

Figure 2:
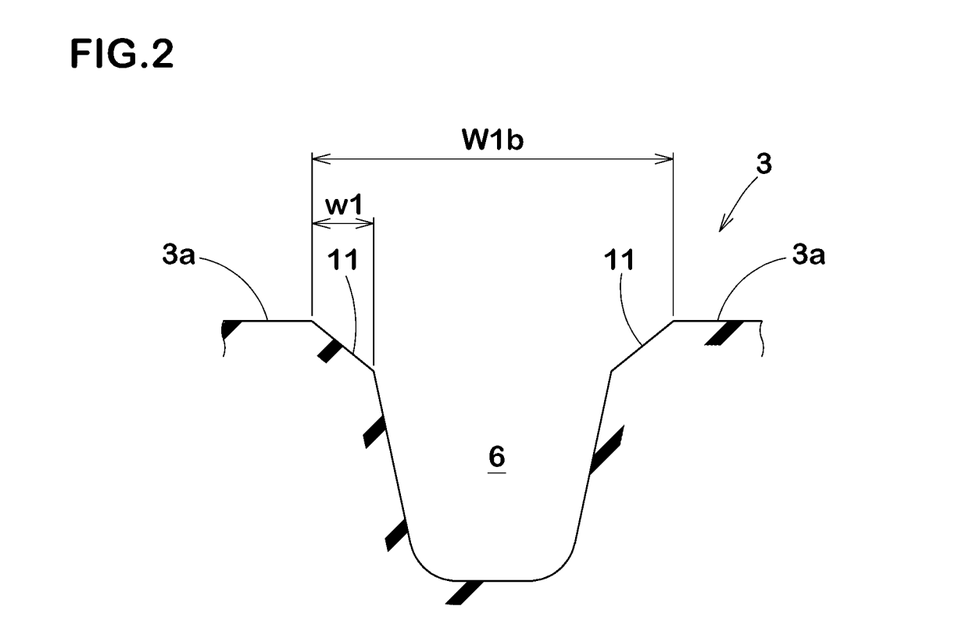
FIG. 2 is a cross-sectional view taken along line D-D of FIG. 1.

In this application, the term "sipe" means a narrow groove having a width not more than 1.5 mm inclusive of a cut having no substantial width. Thus, the term "groove" means a groove having a width more than 1.5 mm FIG. 2 is a cross-sectional view taken along line D-D of FIG. 1. As shown in FIG. 2, the shoulder lateral groove 6 is provided with a chamfer 11.

The chamfer 11 is formed to uniformalize the ground contact pressure acting on the shoulder land region 3 to improve the wear resistance.

The chamfer 11 is formed by an inclined surface extending obliquely from the ground contacting top surface $3a$ of the shoulder land region 3 to the groove side wall of the shoulder lateral groove 6.

In the present embodiment, as shown in FIG. 1, the chamfer 11 comprises a constant width portion $11a$ extending in the longitudinal direction of the shoulder lateral groove 6 with the constant width w1.

The width w1 is measured in the direction orthogonal to the widthwise center line $6c$ of the shoulder lateral groove 6.

In the present embodiment, the constant width portion $11a$ extends from the axially inner end $6i$ of the shoulder lateral groove 6 beyond the tread edge Te.

In the present embodiment, the chamfer 11 comprising the constant width portion $11a$ is provided on each side of the shoulder lateral groove 6 in the groove width direction.

As shown in FIG. 1, the circumferential sipe 7 is spaced apart from the axially inner end $3i$ of the shoulder land region 3 by an axial distance La in a range from 30% to 100% of the axial width Ws of the shoulder land region 3. Thereby, an excessive decrease in the rigidity of the shoulder land region 3 is suppressed, and the wear resistance is maintained high.

Further, the circumferential sipes 7 reduce the torsional rigidity of the shoulder land region 3, and lowers the cornering force. Further, as the circumferential sipes 7 axially divide the shoulder land region 3 to reduce the frictional force in the tire axial direction, the cornering force is reduced. Thereby, the resistance to overturning is maintained.

In order to effectively exert such effect, the axial distance La is preferably not less than 30%, more preferably not less than 50%, but preferably not more than 100%, more preferably not more than 90% of the axial width Ws of the shoulder land region 3.

Figure 3:
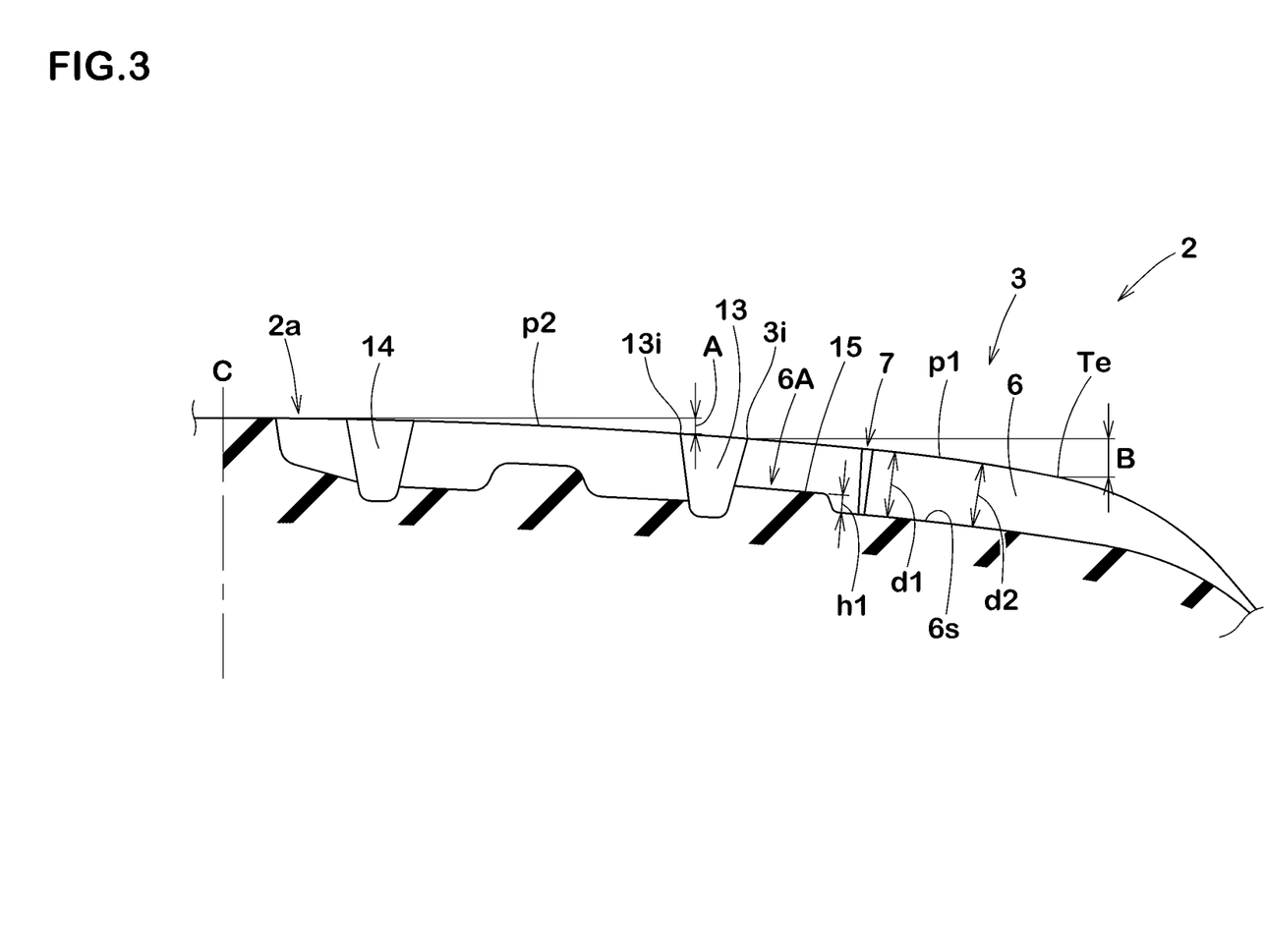
FIG. 3 is a cross-sectional view taken along line E-E of FIG. 1.

FIG. 3 is a cross-sectional view taken along line E-E of FIG. 1. FIG. 3 is a tire meridian cross section of the tire under its standard state.

The depth d1 of the circumferential sipe 7 is equal to or greater than the groove depth d2 of the shoulder lateral groove 6. Thereby, the shoulder land region 3 becomes easier to move during running, and the cornering force becomes smaller, so the resistance to overturning is further improved.

Although not particularly limited, the depth d1 of the circumferential sipe 7 is preferably not more than 1.8 times, more preferably not more than 1.3 times the groove depth d2 of the shoulder lateral groove 6.

As shown in FIG. 1, the tread portion 2 in the present embodiment comprises a pair of the shoulder land regions 3, a pair of middle land regions 4 arranged axially inside the respective shoulder land regions 3, and a crown land region 5 arranged between the middle land regions 4.

The tread portion 2 is provided with a pair of shoulder main grooves 13 between the shoulder land regions 3 and the middle land regions 4, and a pair of crown main grooves 14 arranged between the crown land region 5 and the middle land regions 4.

The shoulder main grooves 13 and the crown main grooves 14 extend continuously in the tire circumferential direction.

The tread portion 2 in the present embodiment is provided with a tread pattern which is point-symmetric about an arbitrary point on the tire equator C.

The tread pattern is however, not limited to such a point-symmetric pattern.

Although not particularly limited, it is preferable that the axial width Ws of the shoulder land region 3 is larger than the axial width Wm of the middle land region 4.

It is preferable that the axial width Wm of the middle land region 4 is larger than the axial width Wc of the crown land region 5.

The axially outer groove edge $13t$ of each shoulder main groove 13 defines the axially inner end $3i$ of the adjacent shoulder land region 3. The axially inner groove edge $13s$ of each shoulder main groove 13 defines the axially outer end $4e$ of the adjacent middle land region 4.

The axially outer groove edge $14t$ of each crown main groove 14 defines the axially inner end $4i$ of the adjacent middle land region 4.

The axially inner groove edge $14s$ of each crown main groove 14 defines the axially outer end $5e$ of the crown land region 5.

In the present embodiment, the axially outer groove edge $13t$ of the shoulder main groove 13 and the axially outer groove edge $14t$ of the crown main groove 14 extend linearly in parallel with the tire circumferential direction.

In the present embodiment, each of the axially outer groove edges $13t$ and $14t$ extend on a straight line parallel with the tire circumferential direction.

The axially inner groove edge $13s$ of the shoulder main groove 13, and the axially inner groove edge $14s$ of the crown main groove 14 each extend in a crank shape (or zigzag shape) in the tire circumferential direction. In the present embodiment, each of the axially inner groove edges 13s and 14s is composed of a first portion a1, a second portion a2, and a third portion a3.

The first portion a1 extends linearly in the tire circumferential direction.

The second portion a2 extends linearly in the tire circumferential direction and is arranged axially inside the first portion a1.

The third portion a3 extends in a tire axial direction to connect the first portion a1 and the second portion a2.

In the present embodiment, each third portion a3 may be extended to a lateral groove disposed in the crown land region 5 or middle land region 4 which will be described later.

Figure 4:
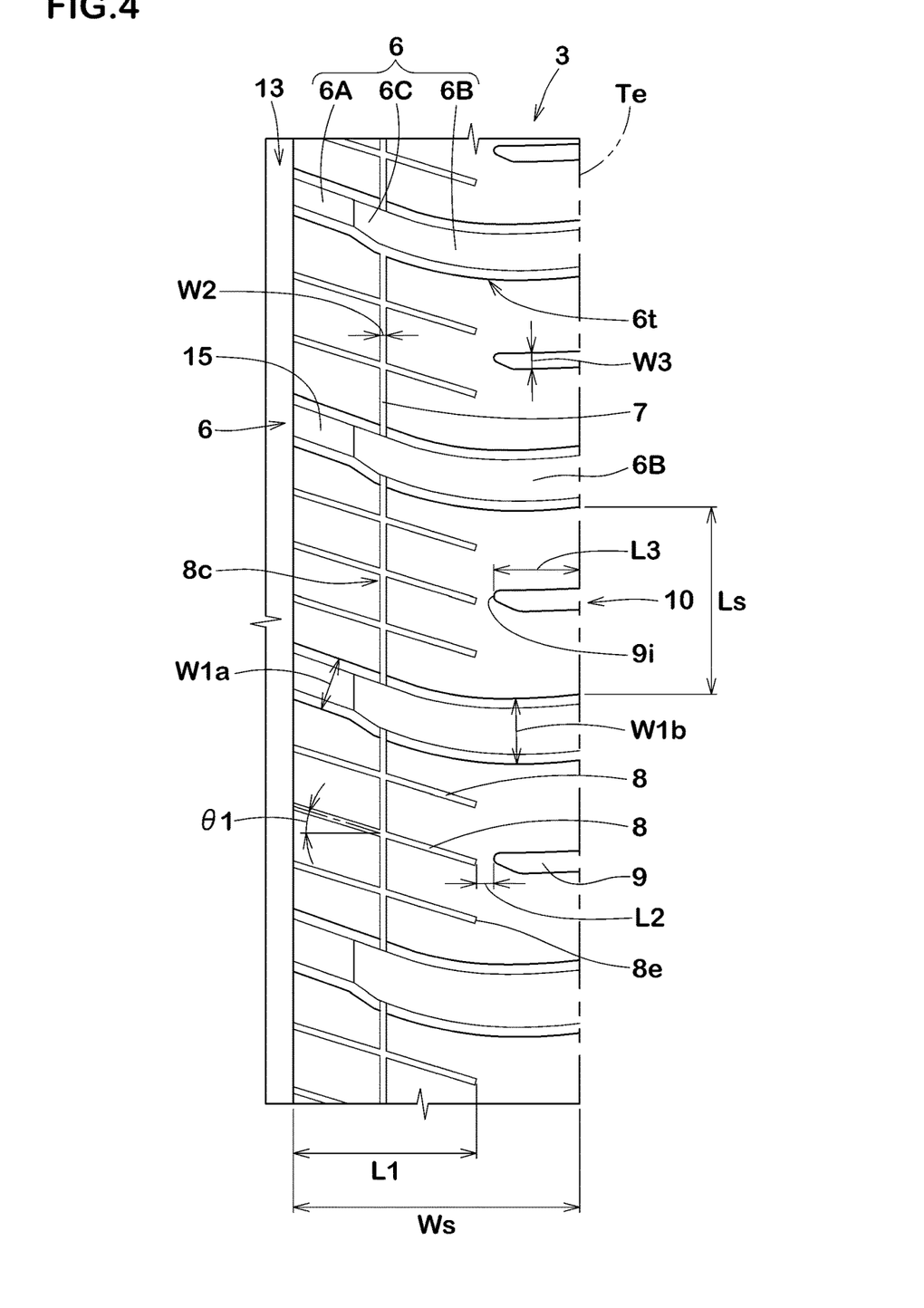
FIG. 4 is a partial plan view of the shoulder land region of FIG. 1.

FIG. 4 shows the shoulder land region 3. As shown in FIG. 4, the shoulder lateral grooves 6 each extend across the entire width of the shoulder land region 3. The shoulder lateral grooves 6 extend axially outwardly from the respective shoulder main grooves 13 beyond the respective tread edges Te. In the present embodiment, since the tire 1 has round shoulders as best shown in FIG. 3, the shoulder lateral grooves 6 can extend beyond the tread edges Te.

Each of the shoulder lateral grooves 6 comprises a narrow portion 6A having a small groove width, a wide portion 6B having a large groove width, and a width changing portion 6C which connects between the narrow portion 6A and the wide portion 6B while changing the groove width continuously.

The narrow portion 6A is connected to the shoulder main groove 13.

The wide portion 6B is extended to the tread edge Te.

The groove width W1b of the wide portion 6B is preferably not less than 105%, more preferably not less than 110%, but preferably not more than 135%, more preferably not more than 130% of the groove width W1a of the narrow portion 6A.

The groove width W1a of the narrow portion 6A is preferably not less than 10%, more preferably not less than 13%, but preferably not more than 25%, more preferably not more than 22% of the axial width Ws of the shoulder land region 3.

The shoulder lateral groove 6 extends in an arc shape protruding toward one side in the tire circumferential direction (lower side in FIG. 4).

In the wide portion 6B of the shoulder lateral groove 6, there is formed a protruding portion 6t protruding toward the one side in the tire circumferential direction.

The shoulder lateral groove 6 is provided with a tie bar 15 in which the groove bottom 6s is raised.

In the present embodiment, the tie bar 15 is formed in the narrow portion 6A. The tie bar 15 is not formed in the wide portion 6B and the width changing portion 6C.

The height h1 (shown in FIG. 3) of the tie bar 15 from the groove bottom 6s is preferably not less than 20%, more preferably not less than 25%, but preferably not more than 40%, more preferably not more than 35% of the groove depth d2 of the shoulder lateral groove 6.

In the present embodiment, the circumferential sipes 7 extend linearly. In the present embodiment, the circumferential sipes 7 extend along a straight line parallel to the tire circumferential direction. However, the circumferential sipes 7 may extend in a zigzag shape or a wavy shape, for example.

The circumferential sipes 7 connect between the wide portions 6B of the shoulder lateral grooves 6.

The circumferential sipe 7 in this example is connected to the shoulder lateral groove 6 at a position closer to the width changing portion 6C than the protruding portion 6t. Such circumferential sipes 7 appropriately reduce the torsional rigidity of the shoulder land region 3, and the overturning prevention performance is maintained high.

The width W2 of the circumferential sipe 7 is preferably 1.0 mm or less. Thereby, an excessive decrease in the rigidity of the shoulder land region 3 is suppressed.

The shoulder land region 3 is provided with axial sipes 8 having an angle θ1 of not more than 30 degrees with respect to the tire axial direction. The angle θ1 is preferably not less than 20 degrees.

Further, the shoulder land region 3 is provided with shoulder narrow lateral grooves 9 having a groove width W3 smaller than that of the shoulder lateral grooves 6.

The axial sipes 8 intersect the circumferential sipes 7. In the present embodiment, the circumferential sipes 7 intersect central portions 8c in the tire axial direction, of the axial sipes 8.

In this application, the central portion 8c of the axial sipe 8 is defined as a portion extending toward both sides in the tire axial direction from the middle position in the tire axial direction of the axial sipe 8 by 10% of the axial length L1 of the axial sipe 8.

The axial sipes 8 extend from the shoulder main groove 13.

In the present embodiment, the axial sipes 8 are terminated at positions axially inside the respective tread edges Te.

The axial lengths L1 of the axial sipes 8 are preferably not less than 55%, more preferably not less than 60%, but preferably not more than 75%, more preferably not more than 70% of the axial width Ws of the shoulder land region 3.

Such axial sipes 8 enhance the overturning resistance and the wear resistance in a well-balanced manner.

In the present embodiment, a plurality of the axial sipes 8 (in this example, two or more axial sipes 8) are disposed between every two of the circumferentially adjacent shoulder lateral grooves 6. In the present embodiment, the axial sipes 8 adjacent to each other in the tire circumferential direction are parallel with each other. Thereby, the rigidity of the shoulder land region 3 becomes uniform, and the wear resistance is improved.

In each of the shoulder land regions 3, shoulder narrow lateral grooves 9 are disposed axially outside the axially outer ends 8e of the axial sipes 8.

The axially inner ends 9i of the shoulder narrow lateral grooves 9 are located axially outside the axially outer ends 8e of the axial sipes 8. Thereby, the rigidity of the shoulder land region 3 is suppressed from being locally reduced.

The shoulder narrow lateral grooves 9 extends axially outwardly beyond the respective tread edges Te.

It is preferable that the axial distance L2 between the axially inner ends 9i of the shoulder narrow lateral grooves 9 and the axially outer ends 8e of the axial sipes 8 is smaller than the axial distance L3 between the axially inner end 9i of the shoulder narrow lateral groove 9 and the tread edge Te. Thereby, the torsional rigidity of the shoulder land region 3 is appropriately reduced, and the overturning prevention performance is enhanced.

The axial distance L2 is preferably not less than 10%, more preferably not less than 15%, but preferably not more than 30%, more preferably not more than 25% of the axial distance L3.

In this example, between every two of the circumferentially adjacent shoulder lateral grooves 6, there is disposed one shoulder narrow lateral groove 9.

The shoulder narrow lateral groove 9 is disposed in a central portion 10 of the circumferential distance Ls between the shoulder lateral grooves 6 adjacent to each other in the tire circumferential direction.

In this application, the central portion 10 is defined as a portion extending toward both sides in the tire circumferential direction from the middle position of the circumferential distance Ls by 10% of the circumferential distance Ls.

The groove width W3 of the shoulder narrow lateral groove 9 is preferably not less than 25%, more preferably not less than 30%, but preferably not more than 50%, more preferably not more than 45% of the groove width W1$a$ of the narrow portion 6A of the shoulder lateral groove 6.

Figure 5:
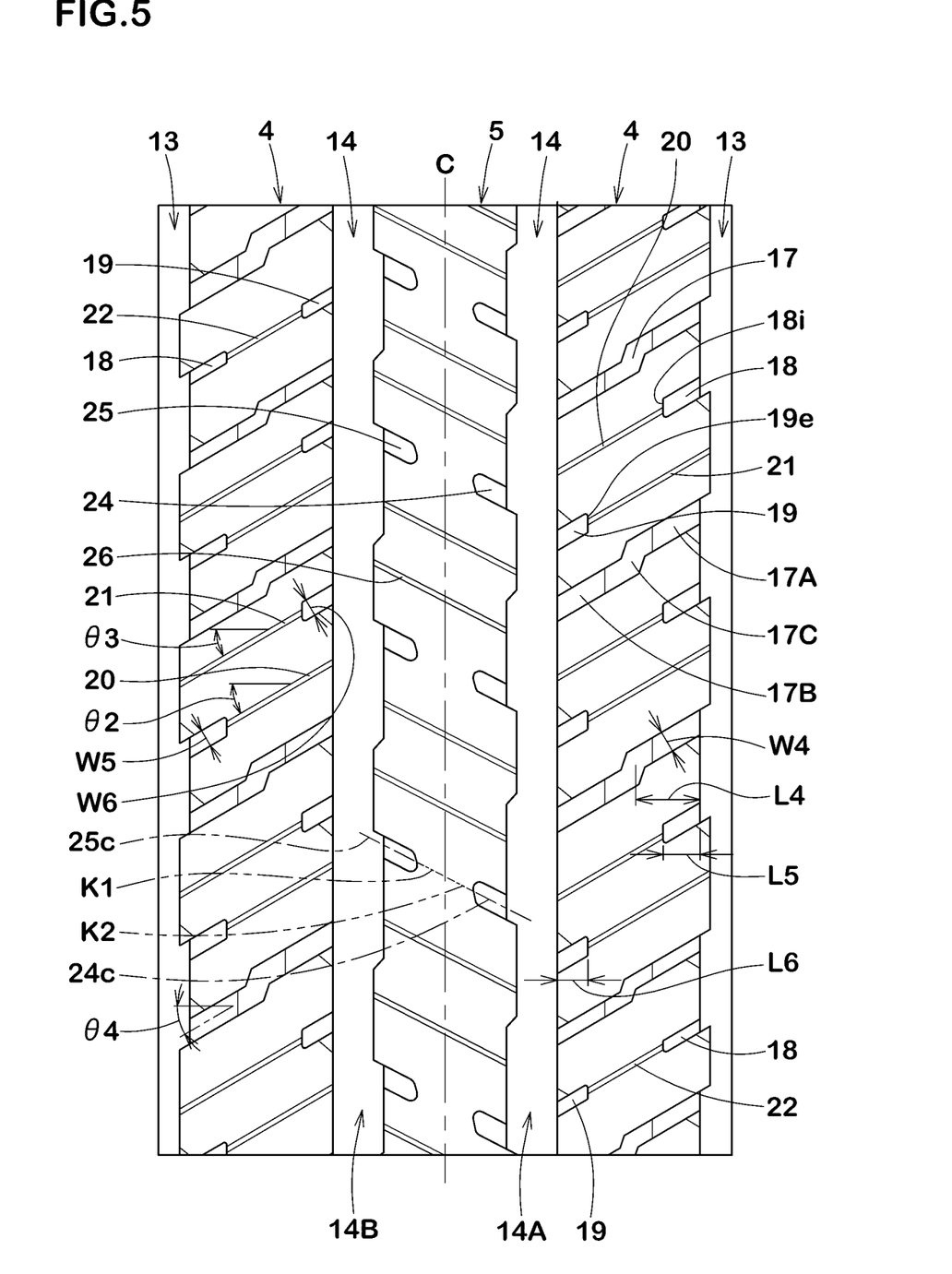
FIG. 5 shows partial plan views of a middle land region and a crown land region of FIG. 1.

FIG. 5 shows the middle land regions 4 and the crown land region 5 of FIG. 1. As shown in FIG. 5, the middle land region 4 in the present embodiment is provided with first middle lateral grooves 17, second middle lateral grooves 18, third middle lateral grooves 19, first middle sipes 20, and second middle sipes 21.

The first middle lateral groove 17 extends across the middle land region 4. The first middle lateral groove 17 is composed of a first inclined portion 17A, a second inclined portion 17B, and a third inclined portion 17C.

The first inclined portion 17A is connected to the shoulder main groove 13, and is inclined with respect to the tire axial direction to one side in the tire circumferential direction toward the axially outside.

The second inclined portion 17B is connected to the crown main groove 14, and extends in parallel with the first inclined portion 17, namely, inclines with respect to the tire axial direction at the same angle as the first inclined portion 17.

The third inclined portion 17C connects between the first inclined portion 17A and the second inclined portion 17B. The third inclined portion 17C is inclined with respect to the tire axial direction to the above-said one side in the tire circumferential direction toward the axially outside at an angle larger than that of the first inclined portion 17A.

The groove width W4 of the first middle lateral groove 17 is smaller than the groove width W1$a$ of the narrow width portion 6A. The groove width W4 is preferably not less than 35%, more preferably not less than 40%, but preferably not more than 55%, more preferably not more than 50% of the groove width W1$a$.

The second middle lateral groove 18 in the present embodiment extends axially inwardly from the shoulder main groove 13 and is terminated to have an axially inner end 18$i$ within the middle land region 4.

The third middle lateral groove 19 in the present embodiment extends axially outwardly from the crown main groove 14 and is terminated to have an axially outer end 19$e$ within the middle land region 4.

The first middle sipe 20 in the present embodiment connects between the crown main groove 14 and the axially inner end 18$i$ of the second middle lateral groove 18.

The second middle sipe 21 in the present embodiment connects between the shoulder main groove 13 and the axially outer end 19$e$ of the third middle lateral groove 19.

The second middle lateral groove 18 and the third middle lateral groove 19 are inclined in the same direction as the first inclined portion 17A. The second middle lateral groove 18 and the third middle lateral groove 19 extend linearly. The axial length L5 of the second middle lateral groove 18 and the axial length L6 of the third middle lateral groove 19 are smaller than the axial length LA of the first inclined portion 17A of the first middle lateral groove 17.

The length L5 and the length L6 are preferably not less than 50%, more preferably not less than 55%, but preferably not more than 70%, more preferably not more than 65% of the length L4.

The groove width W5 of the second middle lateral groove 18 and the groove width W6 of the third middle lateral groove 19 are smaller than the groove width W4 of the first middle lateral groove 17. The groove width W5 and the groove width W6 are preferably not less than 65%, more preferably not less than 70%, but preferably not more than 85%, more preferably not more than 80% of the groove width W4.

The first middle sipe 20 and the second middle sipe 21 are inclined in the same direction as the first inclined portion 17A of the first middle lateral groove 17.

The absolute value |θ2−θ3| of the difference between the angle θ2 of the first middle sipe 20 with respect to the tire axial direction and the angle θ3 of the second middle sipe 21 with respect to the tire axial direction, is preferably not more than 30 degrees, more preferably not more than 15 degrees. In the present embodiment, the absolute value |θ2−θ3| is 0 degree.

The absolute value |θ2−θ4| of the difference between the angle θ2 of the first middle sipe 20 and the angle θ4 of the first inclined portion 17A with respect to the tire axial direction, is preferably not more than 30 degrees, more preferably not more than 15 degrees.
In the present embodiment, the absolute value |θ2−θ4| is 0 degree.

The middle land region 4 may be provided with a third middle sipe 22 connecting between the second middle lateral groove 18 and the third middle lateral groove 19.

The second middle lateral groove 18, the third middle lateral groove 19, and the third middle sipe 22 extend on a straight line.

The crown land region 5 is provided with first crown lateral grooves 24, second crown lateral grooves 25, and crown sipes 26. In the present embodiment, the first crown lateral grooves 24, the second crown lateral grooves 25, and the crown sipes 26 each extend linearly.
The first crown lateral grooves 24, the second crown lateral grooves 25, and the crown sipes 26 are inclined in the same direction with respect to the tire axial direction in the present embodiment.

The first crown lateral groove 24 in the present embodiment extends from one (right side in FIG. 5) 14A of the crown main grooves 14 toward the other (left side in FIG. 5) 14B of the crown main grooves 14 and terminates without reaching the tire equator C.

The second crown lateral groove 25 in the present embodiment extends from the other 14B of the crown main grooves 14 toward the one 14A of the crown main grooves 14 and terminates without reaching the tire equator C.

The first crown lateral groove 24 is arranged on a virtual line K1 which is an extension of the groove center line 25$c$ of the second crown lateral groove 25.

The second crown lateral groove 25 is arranged on a virtual line K2 which is an extension of the groove center line 24$c$ of the first crown lateral groove 24.

In the present embodiment, the virtual line K1 traverses the first crown lateral groove 24 in the longitudinal direction. In the present embodiment, the virtual line K2 traverses the second crown lateral groove 25 in the longitudinal direction.

The crown sipe 26 in the present embodiment extends across the crown land region 5.
In the present embodiment, between every two of the circumferentially adjacent first crown lateral grooves 24, there are disposed two or more crown sipes 26 (in this example, two crown sipes 26).

As shown in FIG. 3, when a distance (A) is defined as the radial distance between the tire equator C on the tread surface 2*a* and the axially inner end 13*i* of the shoulder main groove 13 on the tread surface 2*a*, and
a distance (B) is defined as the radial distance between the axially inner end 3*i* of the shoulder land region 3 on the tread surface 2*a* and the tread edge Te on the tread surface 2*a*, then the distance (A) is smaller than the distance (B).
In other words, in a tire meridian section, the tread surface 2*a* is curved in that manner. Thereby, the ground contact pressure of the tread surface 2*a* of the tread portion 2 is made uniform, and the wear resistance is maintained high.

In order to exert the above-mentioned effect more effectively, the distance (A) is preferably not more than 55%, more preferably not more than 50% of the distance (B).
Further, in order to improve the overturning limit while ensuring excellent wear resistance, the distance (A) is preferably not less than 25%, more preferably not less than 30% of the distance (B).

The distance (A) is preferably 1.0 to 8.0 mm. In particular, in the tire 1 having a tire outer diameter of 750 mm or more, by setting the distance (A) to 8.0 mm or less, the ground contact pressure can be made uniform.

Figure 6:
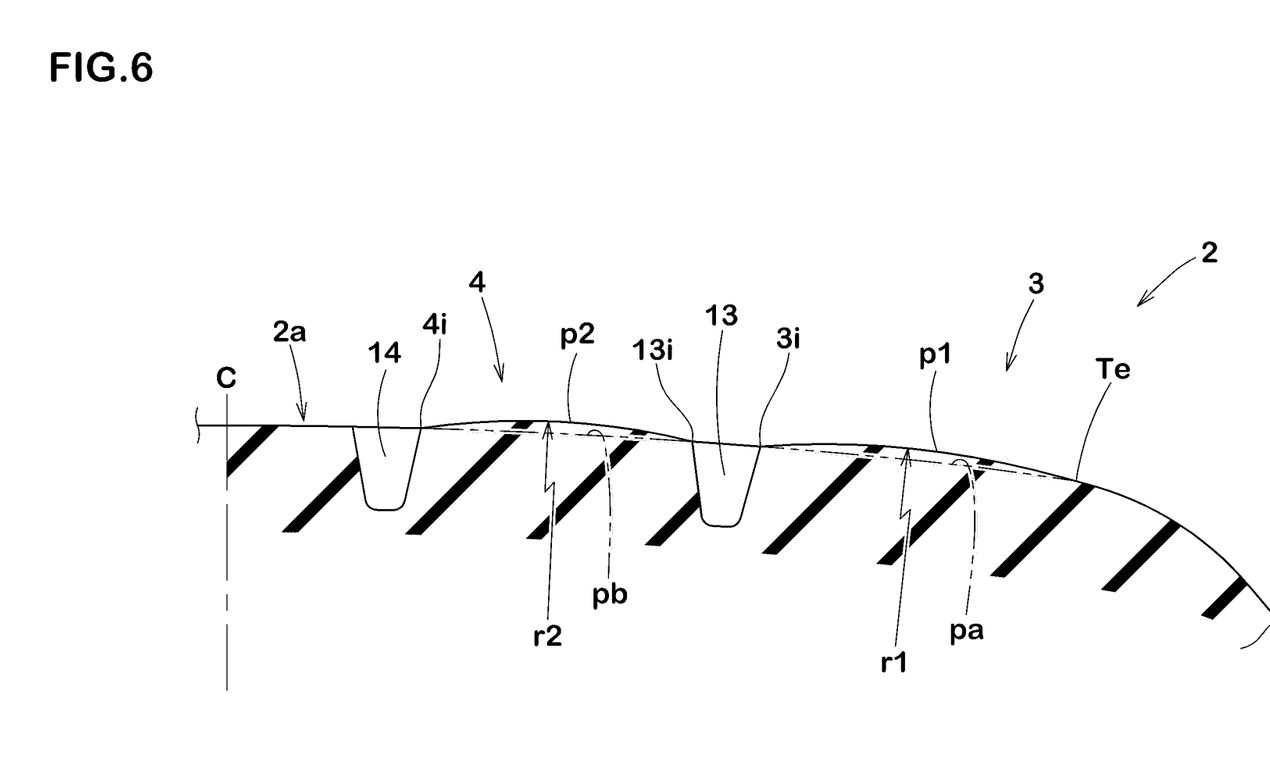
FIG. 6 is a schematic cross-sectional view of the right half of the tread portion of FIG. 1.

FIG. 6 schematically shows a cross section of the right half of the tread portion 2.
As shown in FIG. 6, the shoulder land region 3 from its axially inner end 3*i* toward the outside in the tire axial direction, preferably has a profile p1 which is an arc convex toward the outside in the tire radial direction.
The middle land region 4 from the axially inner end 13*i* of the shoulder main groove 13 toward the inside in the tire axial direction, preferably has a profile p2 which is an arc convex toward the outside in the tire radial direction.
Such tread profile helps to make the ground pressure uniform.

More specifically, in the cross-sectional view as shown in FIG. 6, when a circle "pa" passing through the point of the axially inner end 13*i* of the shoulder main groove 13, the point of the axially inner end 3*i* of the shoulder land region 3, and the point of the tread edge Te, is defined, it is preferable that the profile p1 is positioned on the radially outer side of the circle "pa".
Further, when a circle "pb" passing through the point of the axially inner end 13*i* of the shoulder main groove 13, the point of the axially inner end 3*i* of the shoulder land region 3, and the point of the axially inner end 4*i* of the middle land region 4, is defined, it is preferable that the profile p2 is positioned on the radially outer side of the circle "pb".

It is preferable that the radius r1 of curvature of the profile p1 of the shoulder land region 3 is the same as the radius r2 of curvature of the profile p2 of the middle land region 4.

Figure 7:
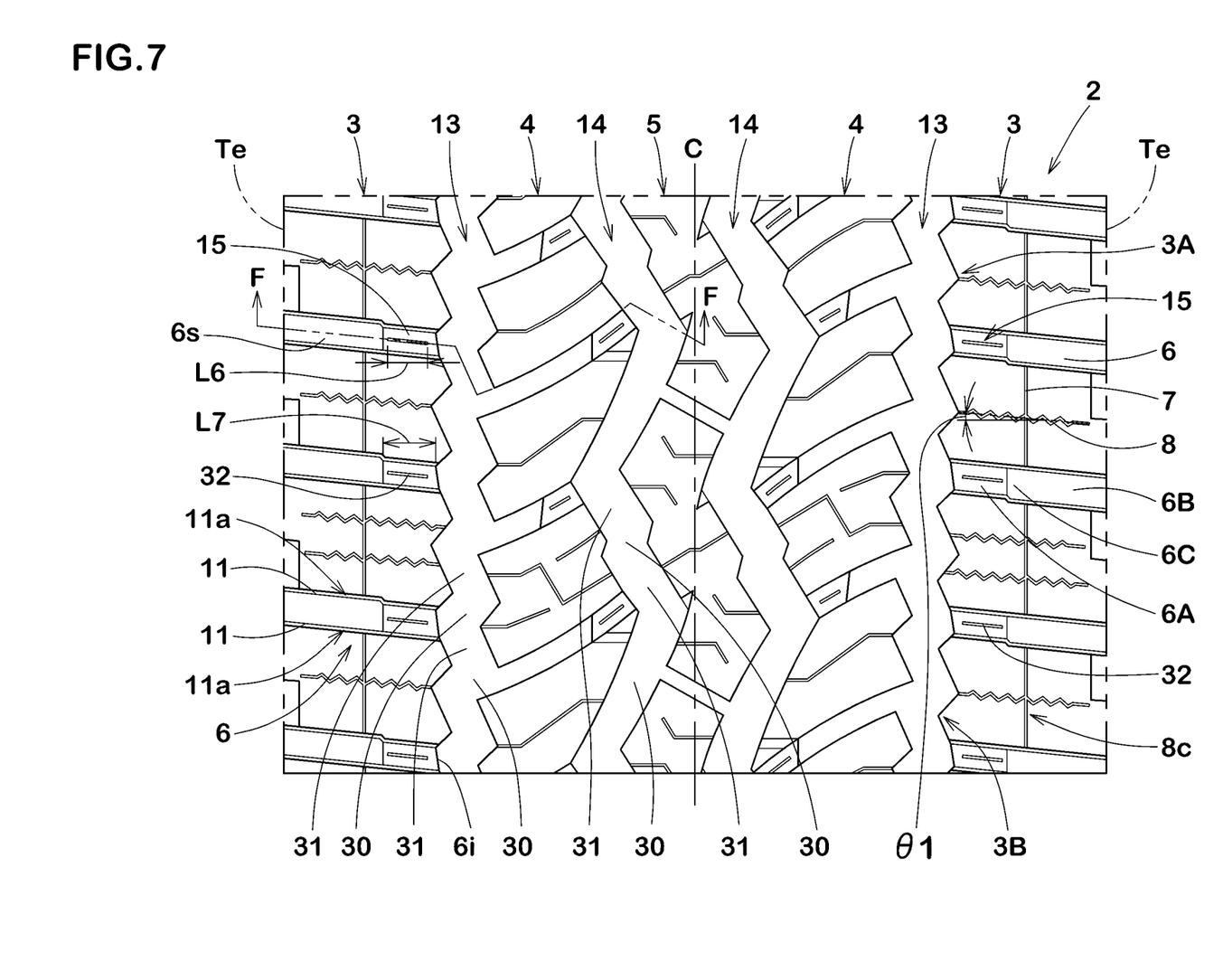
FIG. 7 is a developed partial view of a tread portion of a pneumatic tire as another embodiment of the present disclosure.

FIG. 7 is a developed partial view of the tread portion 2 of a tire as another embodiment of the present disclosure. The components in the present embodiment which are the same as those of the former embodiment may be designated by the same reference numerals and detailed description thereof may be omitted.

As shown in FIG. 7, the tread portion 2 in the present embodiment comprises a pair of shoulder land regions 3, a pair of middle land regions 4, and a crown land region 5.
Further, the tread portion 2 is provided with a pair of shoulder main grooves 13 between the shoulder land regions 3 and the middle land regions 4, and a pair of crown main grooves 14 between the middle land regions 4 and the crown land region 5.

In the present embodiment, each of the shoulder main grooves 13 and the crown main grooves 14 extends in a zigzag shape. And each of the shoulder main grooves 13 and the crown main grooves 14 comprises alternately arranged first groove segments 30 and second groove segments 31.

In the present embodiment, the first groove segments 30 are inclined with respect to the tire circumferential direction to one side in the tire axial direction, whereas
the second groove segments 31 are inclined with respect to the tire circumferential direction to the other side in the tire axial direction.
The zigzag average pitch of the shoulder main groove 13 is larger than the zigzag average pitch of the crown main groove 14.

By the zigzag shoulder main groove 13, the shoulder land region 3 is provided with alternately arranged inside corners 3A and outside corners 3B.
The inside corners 3A are formed at the intersections of the first groove segments 30 and the second groove segments 31 of the shoulder main groove 13, and are concave toward the axially outside.
The outside corners 3B are formed at the intersections of the first groove segments 30 and the second groove segments 31 of the shoulder main groove 13, and are convex toward the axially inside.

The shoulder land region 3 in the present embodiment is provided with shoulder lateral grooves 6, circumferential sipes 7, and axial sipes 8.

The shoulder lateral grooves 6 extend axially outwardly from the respective shoulder main grooves 13 beyond the respective tread edges Te.

The shoulder lateral groove 6 comprises a narrow portion 6A connected to the shoulder main groove 13, a wide portion 6B extending to the tread edge Te, and a width changing portion 6C connecting between the wide portion 6B and the narrow portion 6A.
The narrow portion 6A is extended to the inside corner 3A.

The shoulder lateral groove 6 is provided with a chamfer 11. The chamfer 11 is formed on each side of the shoulder lateral groove 6 in the groove width direction. The chamfer 11 comprises a constant width portion 11*a*.
The constant width portion 11*a* extends from the axially inner end 6*i* of the shoulder lateral groove 6 to the tread edge Te.

Figure 8:
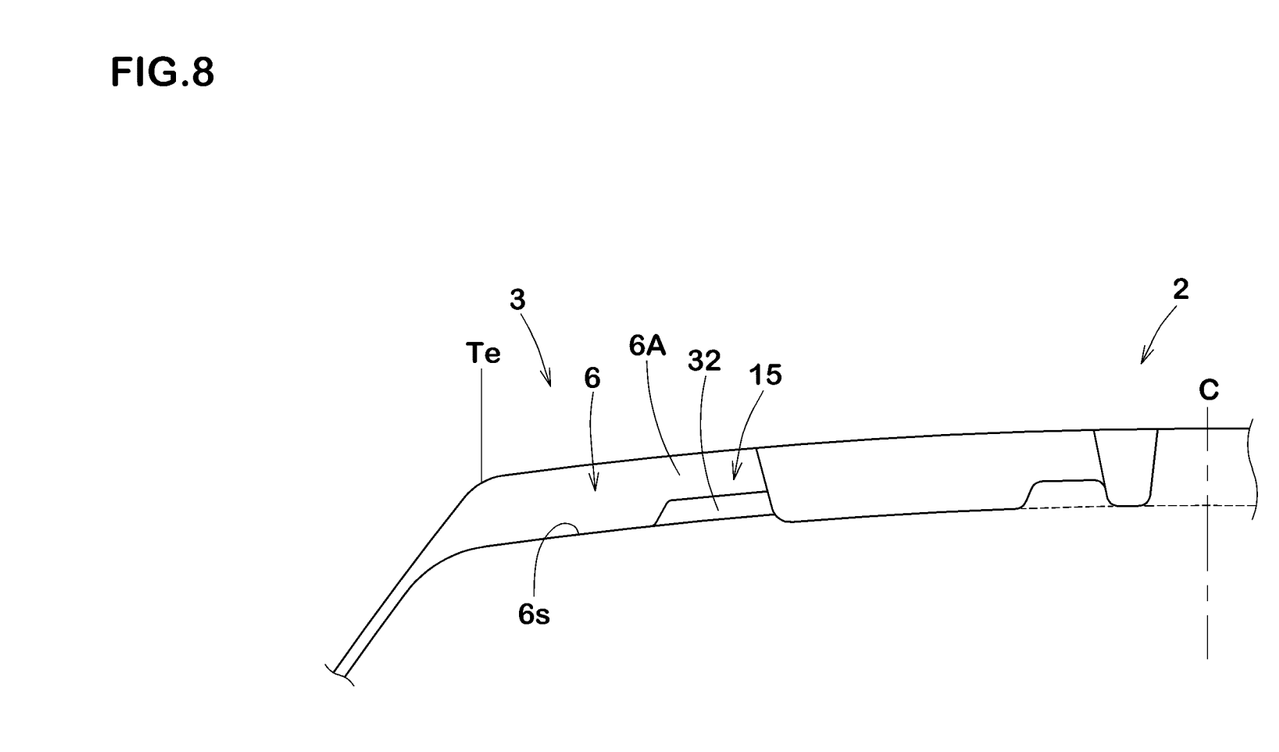
FIG. 8 is a cross-sectional view taken along line F-F of FIG. 7.

FIG. 8 is a cross-sectional view taken along line F-F of FIG. 7. As shown in FIGS. 7 and 8, each shoulder lateral groove 6 is provided with a tie bar 15 having a raised groove bottom 6*s*. The tie bar 15 in this example is disposed in the narrow portion 6A. The tie bar 15 is provided with a groove bottom sipe 32 extending in the longitudinal direction of the narrow portion 6A.
The axial length L6 of the groove bottom sipe 32 is not less than 90% and less than 100% of the axial length L7 of the narrow portion 6A.

In the present embodiment, the circumferential sipe 7 is connected to the wide portions 6B of the shoulder lateral grooves 6. The circumferential sipe 7 intersects an axial center portion 8*c* of the axial sipe 8.

In the present embodiment, the axial sipe 8 extends in a zigzag shape. Such axial sipes 8 reduce the rigidity of the shoulder land region 3, and the overturning prevention performance is maintained high.

Figure 9:
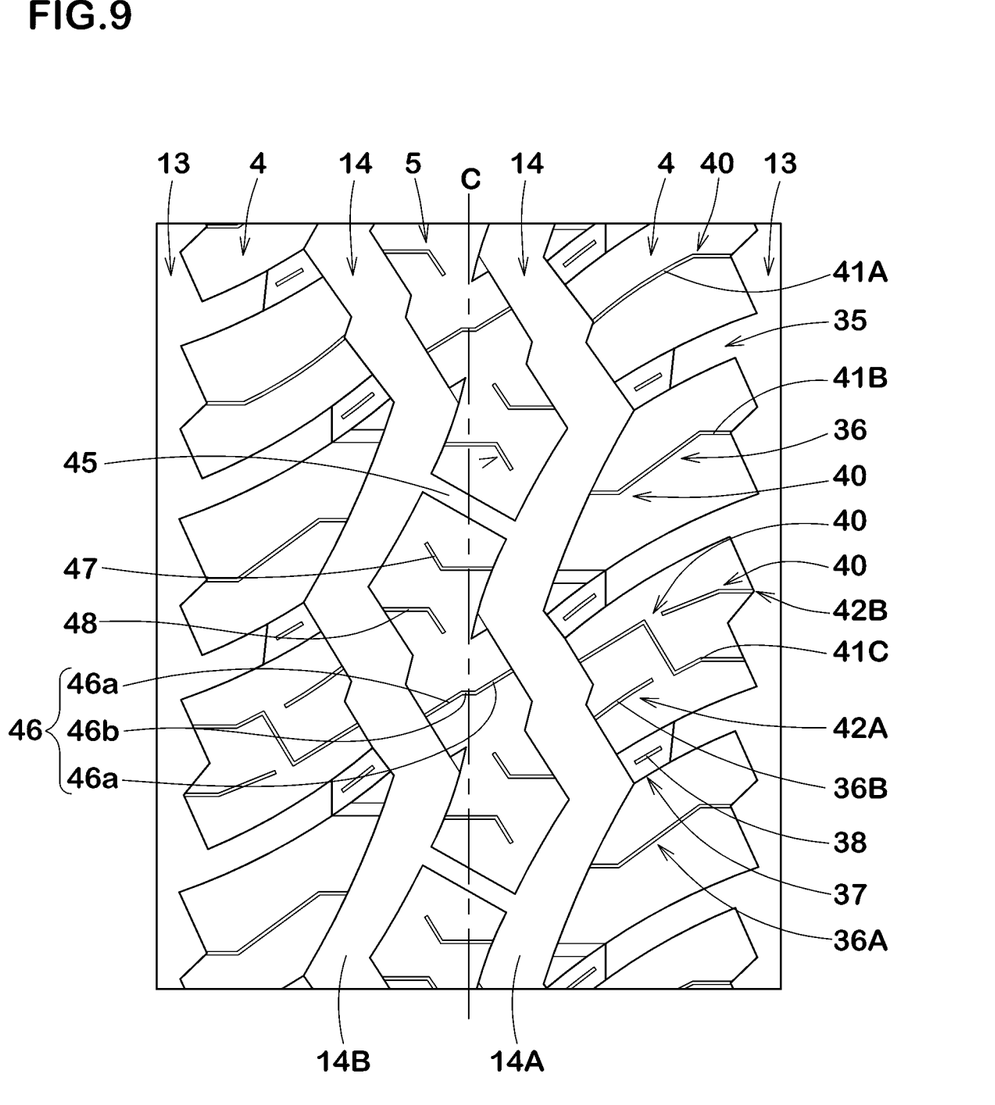
FIG. 9 shows partial plan views of a middle land region and a crown land region of FIG. 7.

FIG. 9 shows the middle land regions 4 and the crown land region 5.
In the present embodiment, each middle land region 4 is provided with middle lateral grooves 35 and middle sipes 36.

The middle lateral groove 35 extends across the middle land region 4. The middle lateral groove 35 is curved in an arc shape convex toward one side in the tire circumferential direction, for example. The middle lateral groove 35 in the present embodiment is provided with a tie bar 37 extending axially inwardly from the crown main groove 14, and the tie bar 37 is provided with a groove bottom sipe 38.

The middle sipes 36 include middle traversing sipes 36A traversing the middle land 4, and middle terminating sipes 36B terminating within the middle land 4. Each middle traversing sipe 36A extends in a bent shape with at least one bent point 40. In the present embodiment, the middle traversing sipes 36A include first traversing sipes 41A having one bent point 40, second traversing sipes 41B having two bent points 40, and third traversing sipes 41C having three bent points 40.

In the present embodiment, the middle terminating sipes 36B include first terminating sipes 42A extending linearly, and second terminating sipes 42B having one bent point 40.

The crown land region 5 is provided with crown lateral grooves 45, first crown sipes 46, second crown sipes 47, and third crown sipes 48.

The crown lateral groove 45 extends linearly across the crown land region 5.

The first crown sipe 46 extends across the crown land region 5.

The first crown sipe 46 is composed of a pair of outer portions 46a and a central portion 46b extending therebetween.

The outer portions 46a are inclined to one direction with respect to the tire axial direction, and the central portion 46b is inclined at an angle different from the outer portions 46a. The central portion 46b in this example is positioned on the tire equator C.

In the present embodiment, the central portion 46b is inclined at a smaller angle with respect to the tire axial direction than the outer portion 46a.

The second crown sipe 47 extends from one 14A of the crown main grooves 14 toward the other 14B of the crown main grooves 14 and terminates within the crown land region 5.

The third crown sipe 48 extends from the other 14B of the crown main grooves 14 toward the one 14A of the crown main grooves 14 and terminates within the crown land region 5.

The second crown sipe 47 extends in a substantially V shape protruding toward one side in the tire circumferential direction.

The third crown sipe 48 extends in a substantially V shape protruding toward the other side in the tire circumferential direction, namely, toward the opposite direction to the second crown sipe 47.

While detailed description has been made of preferable embodiments of the present disclosure, the present disclosure can be embodied in various forms without being limited to the illustrated embodiments.

Comparison Tests

Based on the tread pattern shown in FIG. 1, pneumatic tires of size 255/60R 18 (rim size 18×7.5 J) for passenger cars were experimentally manufactured as test tires (Comparative example tires Ref1-Ref3, Working example tires Ex1-Ex4) and tested for the resistance to overturning and the wear resistance.

Specifications of the test tires are shown in Table 1.

<Overturning Resistance Test>

Test tires were mounted on all wheels of a 3500 cc SUV and inflated to 230 kPa. Using the SUV as a test vehicle, the stability of the test vehicle when critical cornering was made on a dry asphalt road, was evaluated by the test driver from a standpoint of whether the SUV was likely to overturn.

The results are indicated in Table 1 by an index based on Ref.1 being 100, wherein the larger the number, the higher the resistance to vehicle overturning.

<Wear Resistance Test>

Using a tabletop wear energy analyzer, wear energy during braking, driving, and cornering was measured.

The results are indicated in Table 1 by an index based on Ref1 being 100, wherein The larger the number, the better the wear resistance.

TABLE 1

| Tire | Ref1 | Ref2 | Ref3 | Ex1 | Ex2 | Ex3 | Ex4 |
|---|---|---|---|---|---|---|---|
| shoulder lateral groove chamfer | absent | present | present | present | present | present | present |
| circumferential sipe position (%) | 35 | 20 | 35 | 35 | 35 | 35 | 35 |
| d1 (mm) | 6 | 6 | 6 | 6 | 6 | 6 | 6 |
| d2 (mm) | 6 | 6 | 8 | 6 | 4 | 6 | 6 |
| A (mm) | 8 | 8 | 8 | 8 | 8 | 8 | 10 |
| A/B (%) | 40 | 40 | 40 | 40 | 40 | 20 | 40 |
| overturning resistance | 100 | 105 | 105 | 110 | 115 | 105 | 115 |
| wear resistance | 100 | 90 | 90 | 100 | 95 | 100 | 95 |

From the test results, it was confirmed that the tires according to the present disclosure were improved in the overturning resistance without sacrificing the wear resistance.

Statement of the Present Disclosure

The present disclosure is as follows:—

Disclosure 1: A tire comprising: a tread portion comprising a shoulder land region including a tread edge and provided with shoulder lateral grooves and circumferential sipes connecting between the shoulder lateral grooves, wherein     the shoulder lateral grooves are each provided with a chamfer,     the circumferential sipes are each spaced apart from an axially inner end of the shoulder land region by an axial distance of from 30% to 100% of an axial width of the shoulder land region, and     depths of the circumferential sipes are equal to or greater than groove depths of the shoulder lateral grooves.

Disclosure 2: The tire according to Disclosure 1, wherein a width of the circumferential sipe is less than 1.0 mm.

Disclosure 3: The tire according to Disclosure 1 or 2, wherein the tread portion is provided with a shoulder main groove extending in the tire circumferential direction and defining said axially inner end of the shoulder land region, and in the meridian section of the tire under its standard state,
a distance (A) in a tire radial direction between an axially inner end of the shoulder main groove and the tire equator on the tread surface of the tread portion
is smaller than
a distance (B) in the tire radial direction between the axially inner end of the shoulder land region and the tread edge on the tread surface.

Disclosure 4: The tire according to Disclosure 3, wherein the distance (A) is 25% or more of the distance (B).

Disclosure 5: The tire according to Disclosure 3 or 4, wherein the distance (A) is in a range from 1.0 to 8.0 mm.

Disclosure 6: The tire according to any one of Disclosures 1 to 5, wherein the shoulder land region is provided with axial sipes having an angle of not more than 30 degrees with respect to the tire axial direction.

Disclosure 7: The tire according to Disclosure 6, wherein the axial sipes intersect the circumferential sipes.

Disclosure 8: The tire according to Disclosure 6 or 7, wherein the axial sipes are disposed axially inside the tread edge.

Disclosure 9: The tire according to any one of Disclosures 6 to 8, wherein the angle of the axial sipes is not less than 20 degrees.

Disclosure 10: The tire according to any one of Disclosures 1 to 9, wherein
in the meridian section of the tire under its standard state, the shoulder land region from its axially inner end toward the outside in the tire axial direction has a profile which is an arc convex toward the outside in the tire radial direction.

Disclosure 11: The tire according to any one of Disclosures 1 to 10, wherein the tread portion is provided with a shoulder main groove, the tread portion comprises a middle land region adjacent to the shoulder main groove on the axially inside thereof, and
in the meridian section of the tire under its standard state, the middle land region from an axially inner end of the shoulder main groove toward the inside in the tire axial direction, has a profile which is an arc convex toward the outside in the tire radial direction.

DESCRIPTION OF THE REFERENCE SIGNS 1 tire
3 shoulder land region
3i axially inner end of shoulder land region
6 shoulder lateral groove
7 circumferential sipe
11 chamfer
Ws axial width of shoulder land region

The invention claimed is:

1. A tire comprising:
a tread portion comprising a shoulder land region defined between a tread edge and a shoulder main groove extending circumferentially of the tire, and a middle land region defined between the shoulder main groove and an axially inner crown main groove extending circumferentially of the tire,
wherein
the shoulder land region is provided with shoulder lateral grooves and circumferential sipes connecting between the shoulder lateral grooves,
the shoulder lateral grooves are each provided with a chamfer,
the circumferential sipes are each spaced apart from an axially inner end of the shoulder land region by an axial distance of from 30% to 100% of an axial width of the shoulder land region,
depths of the circumferential sipes are equal to or greater than groove depths of the shoulder lateral grooves,
the middle land region is provided with first middle lateral grooves, second middle lateral grooves, third middle lateral grooves, first middle sipes, and second middle sipes,
each of the first middle lateral grooves is crank-shaped and extends across the entire axial width of the middle land region,
each of the second middle lateral grooves extends from the shoulder main groove and is terminated to have an axially inner end within the middle land region,
each of the third middle lateral grooves extends from the crown main groove and is terminated to have an axially outer end within the middle land region,
each of the first middle sipes extends from the crown main groove to one of the axially inner ends of the second middle lateral grooves, and
each of the second middle sipes extends from the shoulder main groove to one of the axially outer ends of the third middle lateral grooves,
each of the first middle lateral grooves is composed of a first inclined portion, a second inclined portion and a third inclined portion connecting between the first inclined portion and the second inclined portion,
the first inclined portions of the first middle lateral grooves, the second middle lateral grooves and the third middle lateral grooves each extend straight, while inclining in the same direction,
the first middle sipes extend straight, while inclining in the same direction as the second middle lateral grooves,
the second middle sipes extend straight, while inclining in the same direction as the third middle lateral grooves,
the middle land region is further provided with third middle sipes, and
each of the third middle sipes extends from the axially inner end of one of the second middle lateral grooves to the axially outer end of one of the third middle lateral grooves so that the third middle sipe, the second middle lateral groove and the third middle lateral groove are arranged in a straight line.

2. The tire according to claim 1, wherein a width of each circumferential sipe is less than 1.0 mm.

3. The tire according to claim 1, wherein in the meridian section of the tire under its standard state, a distance (A) in a tire radial direction between an axially inner end of the shoulder main groove and the tire equator on the tread surface of the tread portion is smaller than a distance (B) in the tire radial direction between the axially inner end of the shoulder land region and the tread edge on the tread surface.

4. The tire according to claim 3, wherein the distance (A) is 25% or more of the distance (B).

5. The tire according to claim 4, wherein in the meridian section of the tire under its standard state, the shoulder land region from its axially inner end toward the outside in the tire axial direction has a profile which is an arc convex toward the outside in the tire radial direction.

6. The tire according to claim 5, wherein in the meridian section of the tire under its standard state, the middle land region from an axially inner end of the shoulder main groove toward the inside in the tire axial direction, has a profile which is an arc convex toward the outside in the tire radial direction.

7. The tire according to claim 3, wherein the distance (A) is in a range from 1.0 to 8.0 mm.

8. The tire according to claim 1, wherein the shoulder land region is provided with axial sipes having an angle of not more than 30 degrees with respect to the tire axial direction.

9. The tire according to claim 8, wherein the axial sipes intersect the circumferential sipes.

10. The tire according to claim 8, wherein the angle of the axial sipes is not less than 20 degrees.

\* \* \* \* \*